(12) United States Patent
Bienkowski et al.

(10) Patent No.: US 9,645,798 B1
(45) Date of Patent: May 9, 2017

(54) USING PROGRAM CODE TO GENERATE HELP INFORMATION, AND USING HELP INFORMATION TO GENERATE PROGRAM CODE

(71) Applicant: The MathWorks, Inc., Natick, MA (US)

(72) Inventors: Joseph R. Bienkowski, Ashland, MA (US); Claudia G. Wey, Wayland, MA (US); Benjamin V. Hinkle, Brookline, MA (US); John E. Booker, Natick, MA (US); Jared D. MacDonald, Cambridge, MA (US); Michelle D. Erickson, Watertown, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 14/842,400

(22) Filed: Sep. 1, 2015

Related U.S. Application Data

(63) Continuation of application No. 14/229,002, filed on Mar. 28, 2014, now Pat. No. 9,141,348.

(51) Int. Cl.
 *G06F 9/44* (2006.01)
(52) U.S. Cl.
 CPC ........................ *G06F 8/34* (2013.01)
(58) Field of Classification Search
 None
 See application file for complete search history.

(56) References Cited

U.S. PATENT DOCUMENTS

| 7,526,753 | B2* | 4/2009 | Spencer | G06F 8/71 717/109 |
|---|---|---|---|---|
| 7,636,887 | B1 | 12/2009 | Kinnucan, Jr. | |
| 7,966,562 | B1 | 6/2011 | Brewton et al. | |

OTHER PUBLICATIONS

Co-pending U.S. Appl. No. 13/828,034, filed Mar. 14, 2013, entitled "Generating Block Recommendations Based on Existing Model Information", Borghesani et al., 55 pages.
Co-pending U.S. Appl. No. 14/229,002, filed Mar. 28, 2014, entitled "Using Program Code to Generate Help Information, and Using Help Information to Generate Program Code", Bienkowski et al., 50 pages.

* cited by examiner

*Primary Examiner* — Qamrun Nahar
(74) *Attorney, Agent, or Firm* — Harrity & Harrity, LLP

(57) ABSTRACT

A device may determine to provide help information associated with a portion of program code included in a program and provided via a user interface of a programming environment. The device may obtain generic help information, associated with the portion of program code, based on determining to provide the help information. The device may determine a set of rules for modifying the generic help information using the portion of program code. The device may analyze the program, using the set of rules, to identify information, included in the program, to be included in modified help information. The device may modify the generic help information, to generate the modified help information, using the information identified based on analyzing the program. The device may provide the modified help information for display via the user interface.

20 Claims, 13 Drawing Sheets

FIG. 5C

TECHNICAL COMPUTING ENVIRONMENT (TCE)

File   Edit   Tools   View   Execute

Code Editor Window

```
W = imread('watermelon.jpg')
A = imshow(W)
help imshow
```
545

Help Window

<u>imshow Modified Help Information</u>

A = imshow(W) displays the image W, and stores the image in the variable A.

Example:

A = imshow(W)

550

<u>Related Functions</u>

B = imresize(W, scale) returns image B that is scale times the size of W. If scale is between 0 and 1, B is smaller than W. If scale is greater than 1, B is larger than W.

Examples:

B = imresize(W, 0.5)

B = imresize(W, 2)

540

500

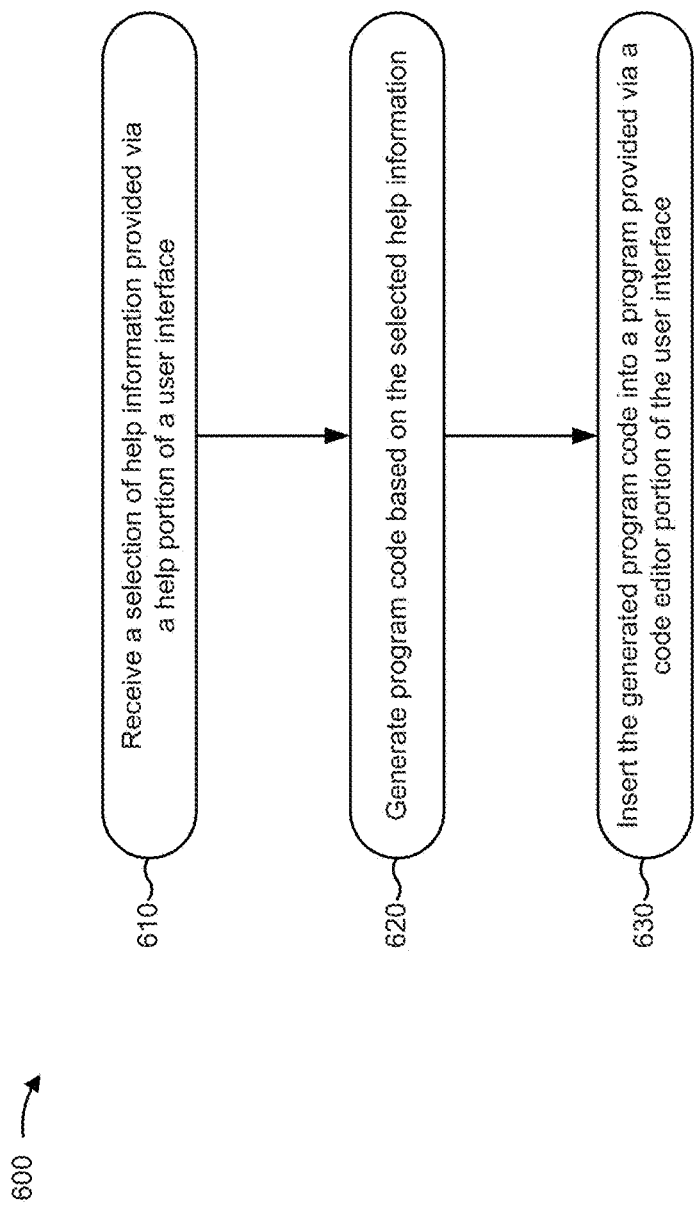

TECHNICAL COMPUTING ENVIRONMENT (TCE)

File   Edit   Tools   View   Execute

Code Editor Window

R = imread('rice.png')

imshow(R)

level = graythresh(R)    — 855

R2 = im2bw(R,level)

imshow(R2)

850
Drag and Drop

Help Window

+  imadjust(R) → Adjusts the contract of image R

−  im2bw(R,level) → Converts image R to black and white

To convert the image R to black and white, use the function *graythresh* to convert the image to binary, and store the result in the variable *level*:

level = graythresh(R)

Then, use the function *im2bw* with the inputs R and *level* to convert the image R to black and white, and store the resulting image metadata in the variable R2:

R2 = im2bw(R,level)

Finally, display the black and white image:

imshow(R2)

840

845

835

800

USING PROGRAM CODE TO GENERATE HELP INFORMATION, AND USING HELP INFORMATION TO GENERATE PROGRAM CODE

RELATED APPLICATION

This application is a continuation of U.S. patent application Ser. No. 14/229,002, filed Mar. 28, 2014, which is incorporated herein by reference.

BRIEF DESCRIPTION OF THE DRAWINGS

FIGS. 5A-5C are diagrams of an example implementation relating to the example process shown in FIG. 4;

FIG. 6 is a flow chart of an example process for using help information to generate program code;

FIGS. 7A and 7B are diagrams of an example implementation relating to the example process shown in FIG. 6; and FIGS. 8A-8C are diagrams of an example implementation relating to the example processes shown in FIG. 4 and FIG. 6.

DETAILED DESCRIPTION

The following detailed description of example implementations refers to the accompanying drawings. The same reference numbers in different drawings may identify the same or similar elements.

A user, such as a computer programmer, may seek help information while writing a program, such as when the user is working with a function or other program code that the user is unfamiliar with. To find help information, the user may search for information relating to the function (or other program code) by using a help tool associated with a programming environment, by using a web browser, etc. However, help information provided by these tools may be displayed in a separate user interface from the programming environment, and may take the user out of the flow of writing the program. Furthermore, help information provided by these tools is usually generic, and not specifically tied to the program that the user is writing. Thus, the user may waste time converting generic help information (e.g., sample program code) to a format that is compatible with the program that the user is writing (e.g., that uses the same variables names, functions, etc.). Implementations described herein assist a user in writing a program more efficiently by providing help information, in a programming environment, that is generated based on the program that the user is writing.

Figure 1:
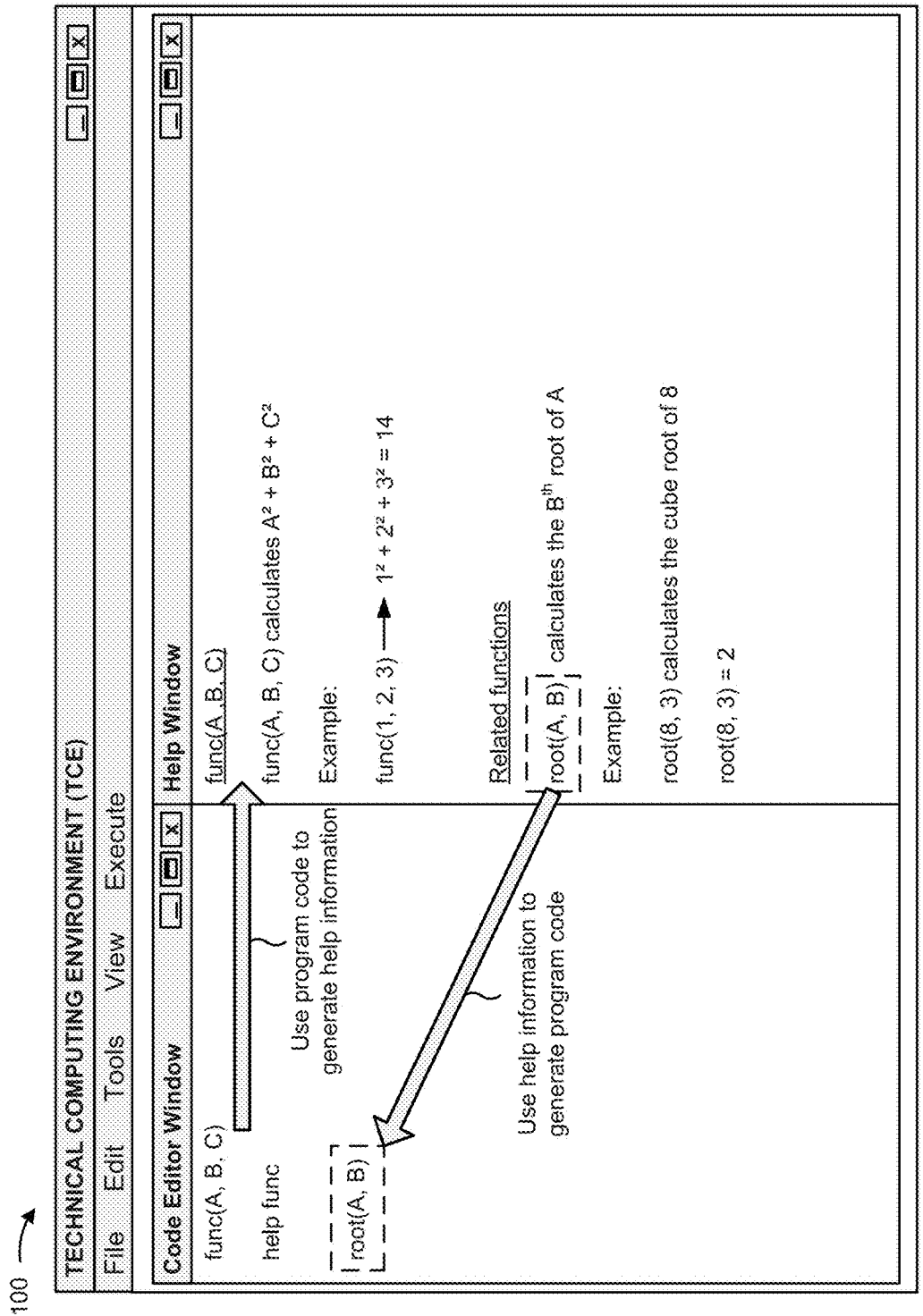
FIG. 1 is a diagram of an overview of an example implementation described herein.

FIG. 1 is a diagram of an overview of an example implementation 100 described herein. As shown in FIG. 1, assume that a technical computing environment (TCE) is executing on a client device. As shown, the TCE may provide a code editor window that permits a user to input program code, and may provide a help window that provides help information associated with the program code input by the user.

As further shown in FIG. 1, assume that the user inputs program code, shown as func(A,B,C), via the code editor window, and then inputs a help command, shown as help func. The help command may include a request for the client device to provide help information associated with the func program code. As shown, the client device analyzes the program code input by the user (e.g., func(A,B,C)) to dynamically generate help information provided by the help window. The client device may use a set of rules to dynamically determine information, included in the program code, to be included in the help information. For example, the help information uses the same variable names (e.g., A, B, and C) as the program code, and explains the func program code using these variable names. In this way, the user may easily see how the user's program code works by reviewing the help information.

As further shown in FIG. 1, the user may interact with the TCE to cause the client device to use help information to generate program code. For example, assume that the client device provides help information associated with functions that are related to func. As an example, assume that the client device provides help information for a function shown as root(A,B). The user may interact with this help information to generate program code in the code editor window. For example, the user may drag and drop the text root(A,B) from the help window to the code editor window, and the client device may generate the program code root(A,B) in a location in the program where the user drops the text. In this way, the user may easily create program code that is immediately usable in a program that the user is writing (e.g., because the help information uses the same variable names as the program), thus simplifying the task of writing the program.

Figure 2:
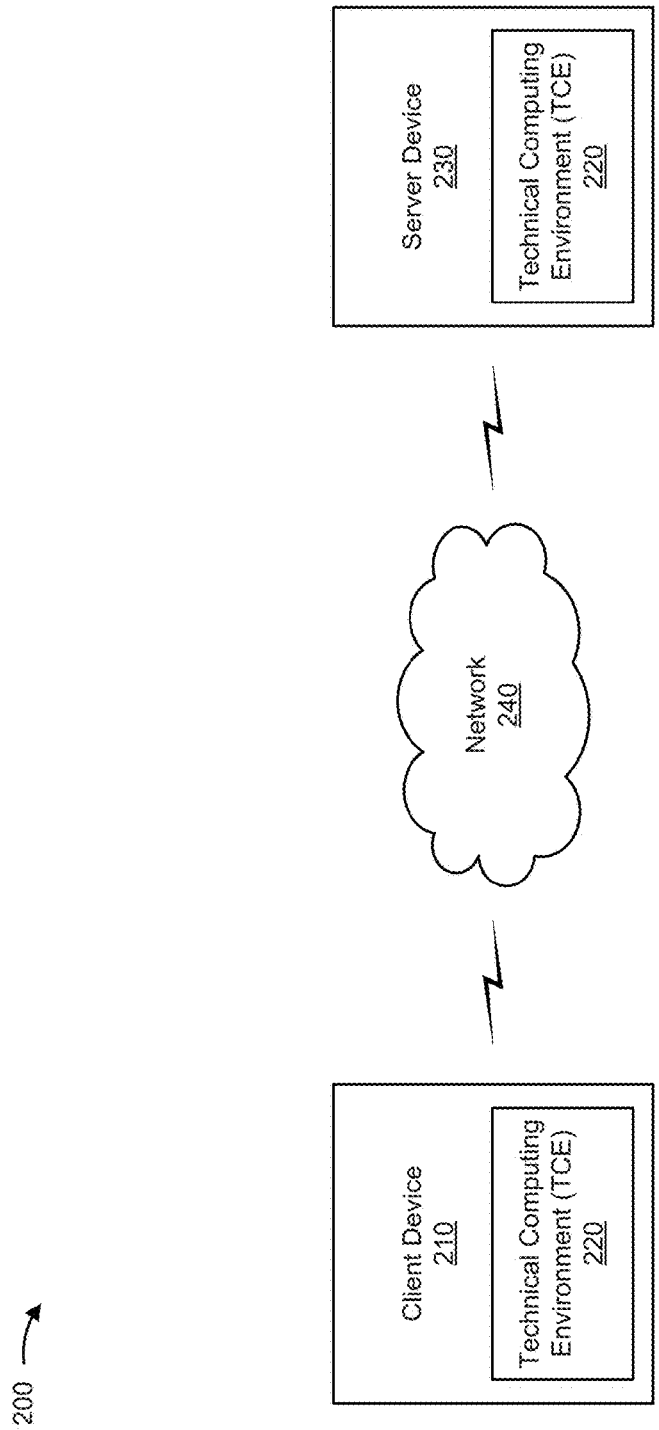
FIG. 2 is a diagram of an example environment in which system and/or methods described herein may be implemented.

FIG. 2 is a diagram of an example environment 200 in which systems and/or methods described herein may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include one or more devices capable of receiving, generating, storing, evaluating, and/or providing program code and/or information associated with program code (e.g., help information, a result of executing the program code, etc.). For example, client device 210 may include a computing device, such as a desktop computer, a laptop computer, a tablet computer, a mobile phone (e.g., a smart phone, a radiotelephone, etc.), or a similar device. Client device 210 may execute program code, may provide help information associated with program code, and/or may perform other operations associated with program code and/or help information. In some implementations, client device 210 may receive information from and/or transmit information to server device 230 (e.g., program code and/or information associated with program code).

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may include a text-based environment (e.g., MATLAB® software by The MathWorks, Inc.), a graphically-based environment (e.g., Simulink® software, State-flow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment.

TCE 220 may include, for example, a user interface that provides a code editor portion that permits a user to input program code (e.g., textual program code, graphical program code, etc.). Additionally, or alternatively, TCE 220 may include a help portion that provides help information associated with the input program code. The code editor portion and the help portion may be provided in separate windows of a user interface, may be integrated within a single window of the user interface, or may be provided in another manner. In some implementations, TCE 220 may include a programming environment that is capable of executing program code.

Server device 230 may include one or more devices capable of receiving, generating, storing, evaluating, and/or providing program code and/or information associated with program code. For example, server device 230 may include a computing device, such as a server, a desktop computer, a laptop computer, a tablet computer, or a similar device. In some implementations, server device 230 may host TCE 220. In some implementations, client device 210 may be used to access one or more TCEs 220 running on one or more server devices 230. For example, multiple server devices 230 may be used to execute program code (e.g., serially or in parallel), and may provide respective results of executing the program code to client device 210.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a user interface) may be separated from back-end applications (e.g., program code execution).

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
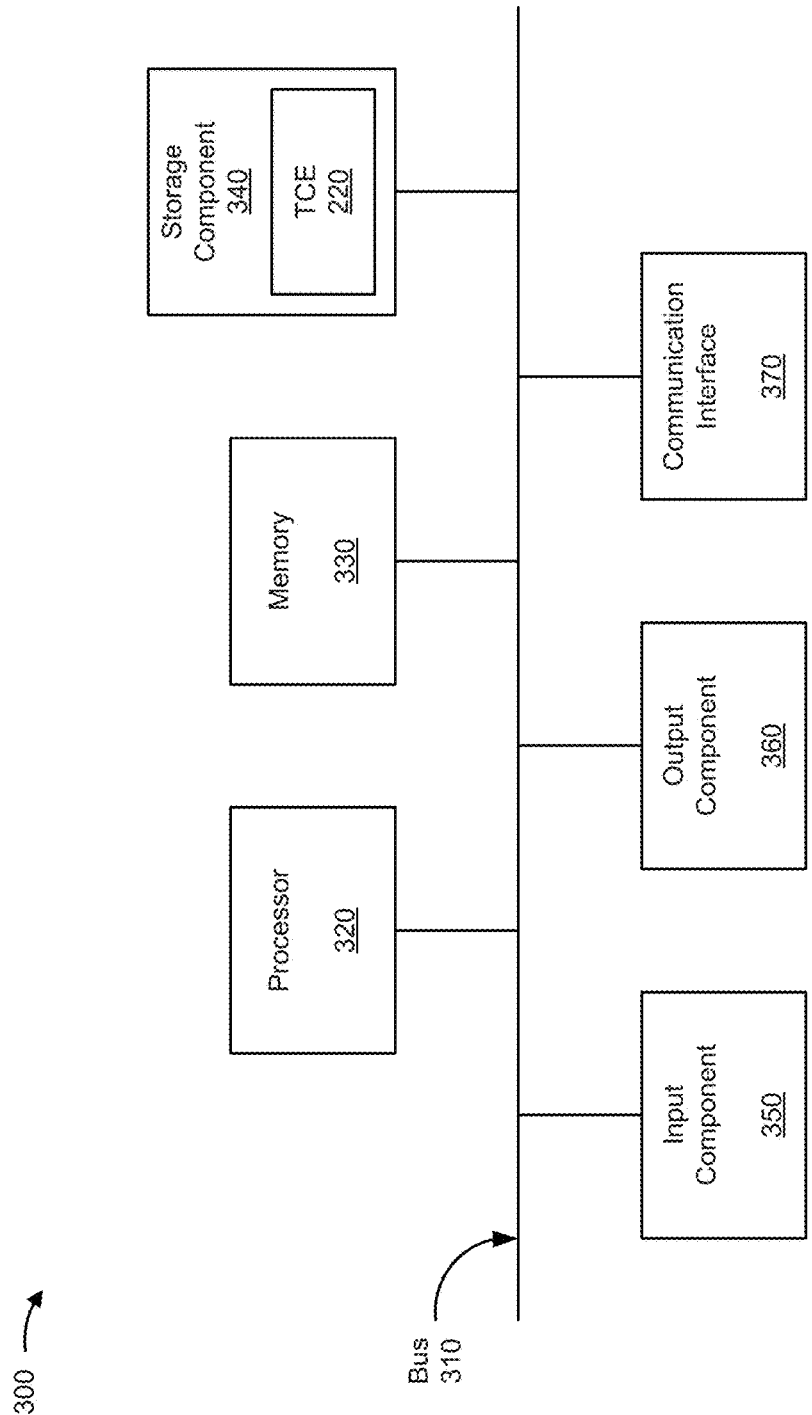
FIG. 3 is a diagram of example components of one or more devices of FIG. 2.

FIG. 3 is a diagram of example components of a device 300, which may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit, etc.), a microprocessor, a microcontroller, and/or any processing component (e.g., a field-programmable gate array (FPGA), an application-specific integrated circuit (ASIC), an Arduino microcontroller, etc.) that interprets and/or executes instructions (e.g., according to an instruction set architecture), and/or that is designed to implement one or more computing tasks. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, a high-definition multimedia interface (HDMI), etc.

Device 300 may perform one or more processes described herein. Device 300 may perform these processes in response to processor 320 executing software instructions included in a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Figure 4:
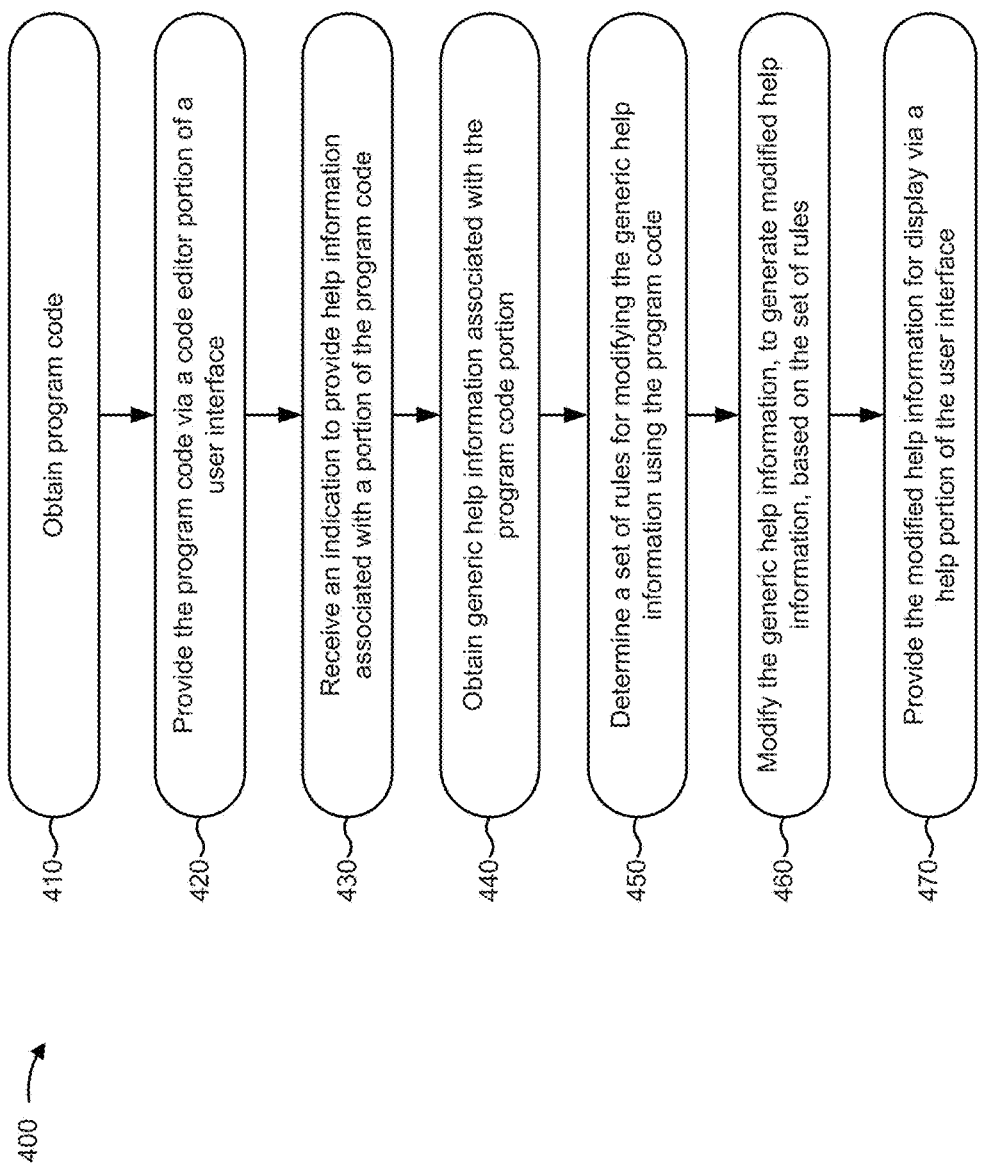
FIG. 4 is a flow chart of an example process for using program code to generate help information.

FIG. 4 is a flow chart of an example process 400 for using program code to generate help information. In some implementations, one or more process blocks of FIG. 4 may be performed by client device 210. In some implementations, one or more process blocks of FIG. 4 may be performed by another device or a group of devices separate from or including client device 210, such as server device 230.

As shown in FIG. 4, process 400 may include obtaining program code (block 410). For example, client device 210 may obtain program code. In some implementations, a user may input information identifying the program code or a memory location at which the program code is stored (e.g., local to and/or remote from client device 210). Based on the user input, client device 210 may retrieve the program code. Additionally, or alternatively, client device 210 may provide a user interface (e.g., via TCE 220) via which a user may input program code, and client device 210 may obtain the program code based on the user input. In some implementations, client device 210 may obtain program code based on a context associated with TCE 220. For example, client device 210 may determine that a user is performing a particular action within TCE 220, and may obtain program code associated with the particular action.

Program code (sometimes referred to herein as code) is to be broadly interpreted to include text-based code that may not require further processing to execute (e.g., C++ code, Hardware Description Language (HDL) code, very-high-speed integrated circuits (VHSIC) HDL (VHDL) code, Verilog code, Java code, another type of hardware and/or software based code that may be compiled and/or synthesized, etc.), binary code that may be executed (e.g., executable files that may be directly executed by an operating system, bitstream files that may be used to configure an FPGA, Java byte code, object files combined together with linker directives, source code, makefiles, etc.), text files that may be executed in conjunction with other executables (e.g., Python text files, Octave files, a collection of dynamic-link library (DLL) files with text-based combining, configuration information that connects pre-compiled modules, an extensible markup language (XML) file describing module linkage, etc.), source code (e.g., readable by a human), machine code (e.g., readable by a machine), or the like.

In some implementations, program code may include different combinations of the above-identified classes of code (e.g., text-based code, binary code, text files, source code, machine code, etc.). Additionally, or alternatively, program code may include code generated using a dynamically-typed programming language (e.g., the M language, a MATLAB® language, a MATLAB-compatible language, a MATLAB-like language, etc.) that may be used to express problems and/or solutions using mathematical notations. Additionally, or alternatively, program code may be of any type, such as a function, a script, an object, etc.

As further shown in FIG. 4, process 400 may include providing the program code via a code editor portion of a user interface (block 420). For example, client device 210 may provide, via TCE 220, a user interface that includes a code editor portion (e.g., a code editor window) for displaying program code. Client device 210 may provide the obtained program code via the code editor portion of the user interface. Client device 210 may provide the program code by, for example, loading the program code from a file and providing the program code for display, receiving the program code via user input (e.g., textual input) and providing the program code for display, etc.

As further shown in FIG. 4, process 400 may include receiving an indication to provide help information associated with a portion of the program code (block 430). For example, client device 210 may receive (e.g., via input from a user and/or another device) an indication to provide help information associated with a portion of program code. A portion of program code (sometimes referred to herein as a program code portion) may refer to a portion of a program, such as one or more lines of program code, a string of one or more characters of program code, a set of strings of program code, a block of program code, a function, a method, a script, an object, or the like.

In some implementations, a user may provide input identifying a portion of program code (e.g., by interacting with a portion of program code, by indicating one or more line numbers of code to be evaluated to provide help information, by highlighting a portion of program code, etc.), and client device 210 may receive an indication to provide help information associated with the identified portion of program code. For example, the user may select a portion of program code, may leave a portion of program code (e.g., by pressing "Enter" on a keyboard to cause a line of program code to be left), may input a portion of program code, may input a syntactically correct portion of program code, may input a help command (e.g., "help"), etc. Additionally, or alternatively, client device 210 may receive the indication to provide help information based on detecting an error associated with a program code portion provided via the code editor portion.

In some implementations, a user may select a program code portion, and may provide input that causes client device 210 to provide help information associated with the selected program code portion. For example, the user may highlight a program code portion (e.g., using a cursor), and may click on a help input mechanism (e.g., a help button, a help menu item, a help link, etc.). Additionally, or alternatively, the user may input a help command in association with a program code portion. For example, the user may type "help sqrt" in the code editor portion to cause client device 210 to provide help information associated with the "sqrt" function.

As further shown in FIG. 4, process 400 may include obtaining generic help information associated with the program code portion (block 440). For example, client device 210 may obtain generic help information associated with a program code portion identified by a user. Client device 210 may analyze the user-identified program code to determine one or more program code portions, included in the user-identified program code, for which generic help information is available. The generic help information may include help information, stored in a data structure, that has not been modified based on the obtained program code (e.g., provided via the code editor portion of the user interface).

Client device 210 may use the identified program code portion(s) to search a data structure for help information, in some implementations. For example, if the user inputs a help command, such as "help sqrt," client device 210 may search a data structure using "sqrt" to identify help information associated with the "sqrt" function. In some implementations, the data structure may be stored locally by client device 210. Additionally or alternatively, the data structure may be stored by a device that is remote from client device 210 (e.g., server device 230). The data structure may identify a relationship between a particular program code portion and generic help information associated with the particular program code portion. In this way, client device 210 may identify generic help information associated with a particular program code portion.

In some implementations, client device 210 may determine the generic help information based on a type of variable included in the program code. For example, the program code may generate a variable with a particular data type (e.g., a string, an integer, a Boolean value, a floating point value, an array, etc.), with a particular property (e.g., a particular length, a particular array size, etc.), etc. Client device 210 may provide generic help information for program code (e.g., one or more functions) capable of using the type of variable (e.g., as input).

As further shown in FIG. 4, process 400 may include determining a set of rules for modifying the generic help information using the program code (block 450), and modifying the generic help information, to generate modified help information, based on the set of rules (block 460). For example, client device 210 may determine a set of rules to be used to modify the generic help information to generate modified help information. Client device 210 may analyze the program code (e.g., a selected program code portion, a program code portion that is related to the selected program code portion, etc.), using the set of rules, to modify the generic help information.

Client device 210 may determine the set of rules based on the generic help information, in some implementations. For example, the generic help information may include information (e.g., metadata) that identifies the set of rules to be applied to convert the generic help information to modified help information. In some implementations, client device 210 may apply a different set of rules to different sets of generic help information. Additionally, or alternatively, client device 210 may determine a default set of rules (e.g., based on information stored in a data structure). In this case, client device 210 may apply a same set of rules to different sets of generic help information. Additionally, or alternatively, client device 210 may determine a subset of the set of rules that apply to particular generic help information (e.g., based on information included in the generic help information). In some implementations, client device 210 may verify that a particular rule applies to particular generic help information, in some implementations.

In some implementations, the generic help information may include one or more indicators that identify replaceable information included in the generic help information. Client device 210 may apply the set of rules to determine replacement information to replace the replaceable information. The replacement information may include information included in the program code, or information generated based on the program code.

As an example, the generic help information may include replaceable variable names. Client device 210 may apply a set of rules to determine replacement variable names, included in the program code, that correspond to the replaceable variable names included in the generic help information. For example, the set of rules may indicate that the replacement variable name be associated with a particular type of variable (e.g., a variable with a same data type as a replaceable variable), be used as an input to a particular function (e.g., a same input as a replaceable variable), be generated as an output from a particular function (e.g., a same output as a replaceable variable), etc. Client device 210 may replace the replaceable variable names with the replacement variable names. In this way, when client device 210 provides the help information, the help information will be customized based on the user's program code, and the help information may be more relevant to the user and/or a program provided via the code editor window.

As another example, the generic help information may include information associated with a particular set of inputs for a function. The program code may include a different set (e.g., a subset) of inputs associated with the function (e.g., the user may not use all inputs in connection with a function). Client device 210 may modify the generic help information to only include the inputs included in the program code. For example, the help information may include an explanation of the inputs that appear in the program code provided via the code editor window, and may exclude explanations of inputs that do not appear in the program code provided via the code editor window.

As another example, client device 210 may apply the set of rules to a workspace associated with the program code, such as a folder that stores information used by the program code. As an example, the folder may store an object, such as an image file, a video, audio, etc., and client device 210 may replace a replaceable object, in the generic help information, with a replacement object stored in the folder.

As further shown in FIG. 4, process 400 may include providing the modified help information for display via a help portion of the user interface (block 470). For example, client device 210 may provide the modified help information for display via a help portion (e.g., a help window) of the user interface (e.g., provided via TCE 220). Client device 210 may concurrently provide both the code editor portion and the help portion via the user interface (e.g., both portions may be displayed on the user interface at the same time). In some implementations, client device 210 may provide the code editor portion and the help portion side-by-side, so as to convey a correspondence between modified help information, displayed in the help portion, and program code, displayed in the code editor portion, to which the modified help information relates. Additionally, or alternatively, client device 210 may provide the code editor portion and the help portion in another manner (e.g., top to bottom). In some implementations, client device 210 may provide multiple portions of program code via the code editor portion of the user interface, and may provide multiple corresponding portions of help information via the help portion of the user interface.

In some implementations, client device 210 may receive input to toggle between displaying help information side-by-side (e.g., side-by-side with the program code, such as via a separate window) or in-line (e.g., in-line with program code, such as in the same window). As an example, a user may identify help information to be provided in-line with program code, and client device 210 may provide the help information in-line with corresponding program code (e.g., in the code editor window), where help information is provided immediately after program code used to generate the help information. As another example, the user may identify help information to be provided side-by-side with program code (e.g., in the help window), and client device 210 may provide the help information side-by-side with corresponding program code. In some implementations, client device 210 may differentiate help information provided in-line, such as by marking the help information and/or corresponding program code in a different manner (e.g., highlighting the help information, highlighting the corresponding program code, etc.).

Client device 210 may provide, via a user interface, an indication of a correspondence (e.g., a correspondence indicator) between a program code portion and help information, in some implementations. Client device 210 may provide the correspondence indicator via the code editor window and/or the help window, in some implementations. For example, client device 210 may provide a first correspondence indicator related to a particular portion of code, and/or may provide a second correspondence indicator related to particular help information generated based on the particular portion of code. A correspondence indicator may include, for example, highlighting the particular portion of code and the corresponding help information (e.g., using a same color), outlining the particular portion of code and the corresponding help information (e.g., using a same color, line weight, line style, etc.), marking the particular portion of code and the corresponding help information (e.g., using a same number, letter, character, symbol, etc.), aligning the particular portion of code and the corresponding help information, or the like.

In some implementations, client device 210 may provide multiple correspondence indicators to indicate different correspondences between different program code portions and respective corresponding help information. Client device 210 may provide the multiple correspondence indicators in a different manner (e.g., using a different color, a different line style, a different marking, etc.). In this way, a user may easily see a relationship between a particular portion of program code and corresponding help information associated with the particular portion of program code.

Client device 210 may generate sample code to be included in the modified help information, in some implementations. In this case, client device 210 may execute the sample code, and may provide a result of executing the sample code via the help window. In some implementations, client device 210 may permit the user to modify the sample code (e.g., by changing an input value), may execute the modified sample code, and may provide a result of executing the modified sample code. In this way, a user may see a result of including the sample code in the user's program.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
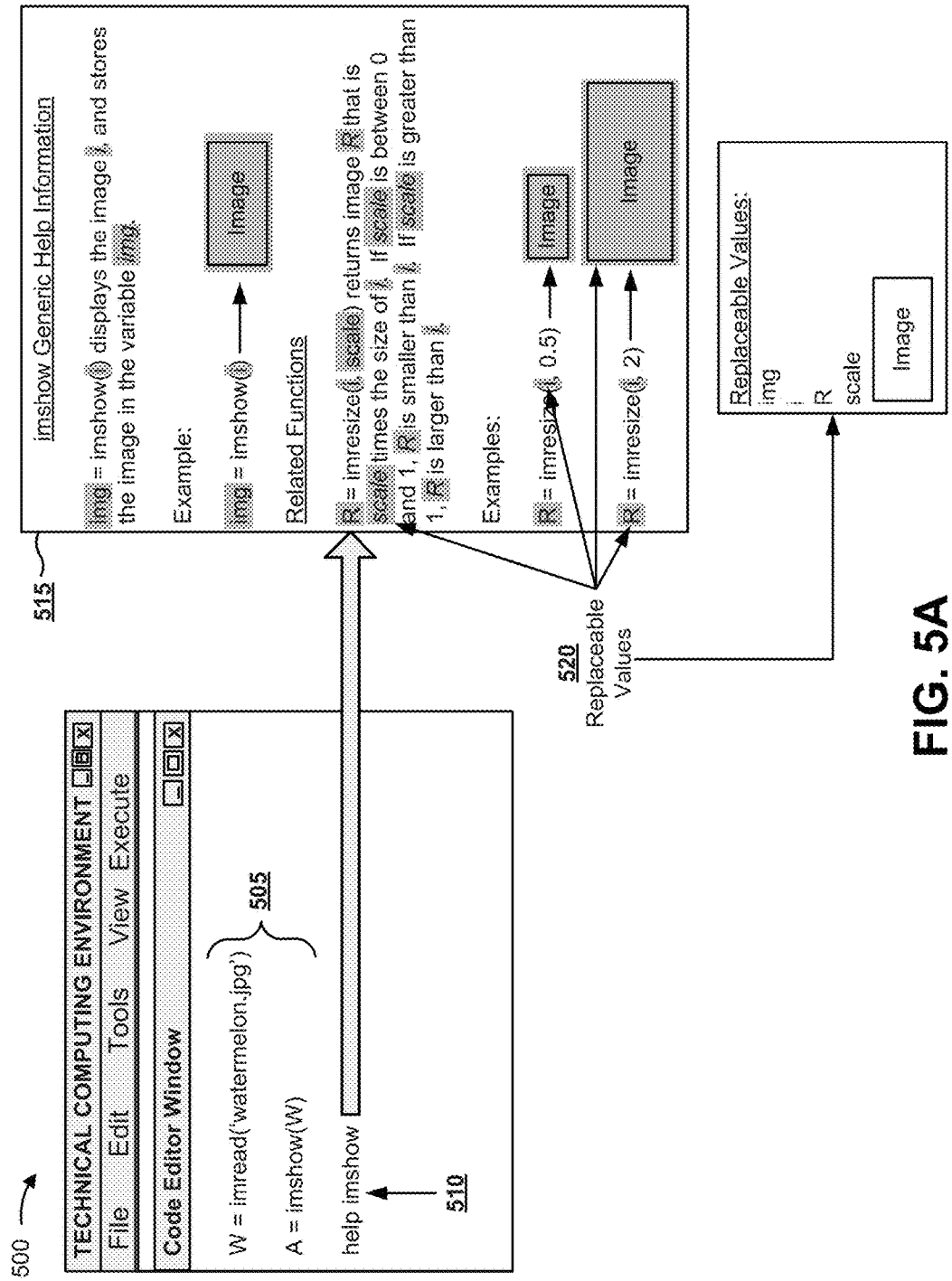
Figure 5B:
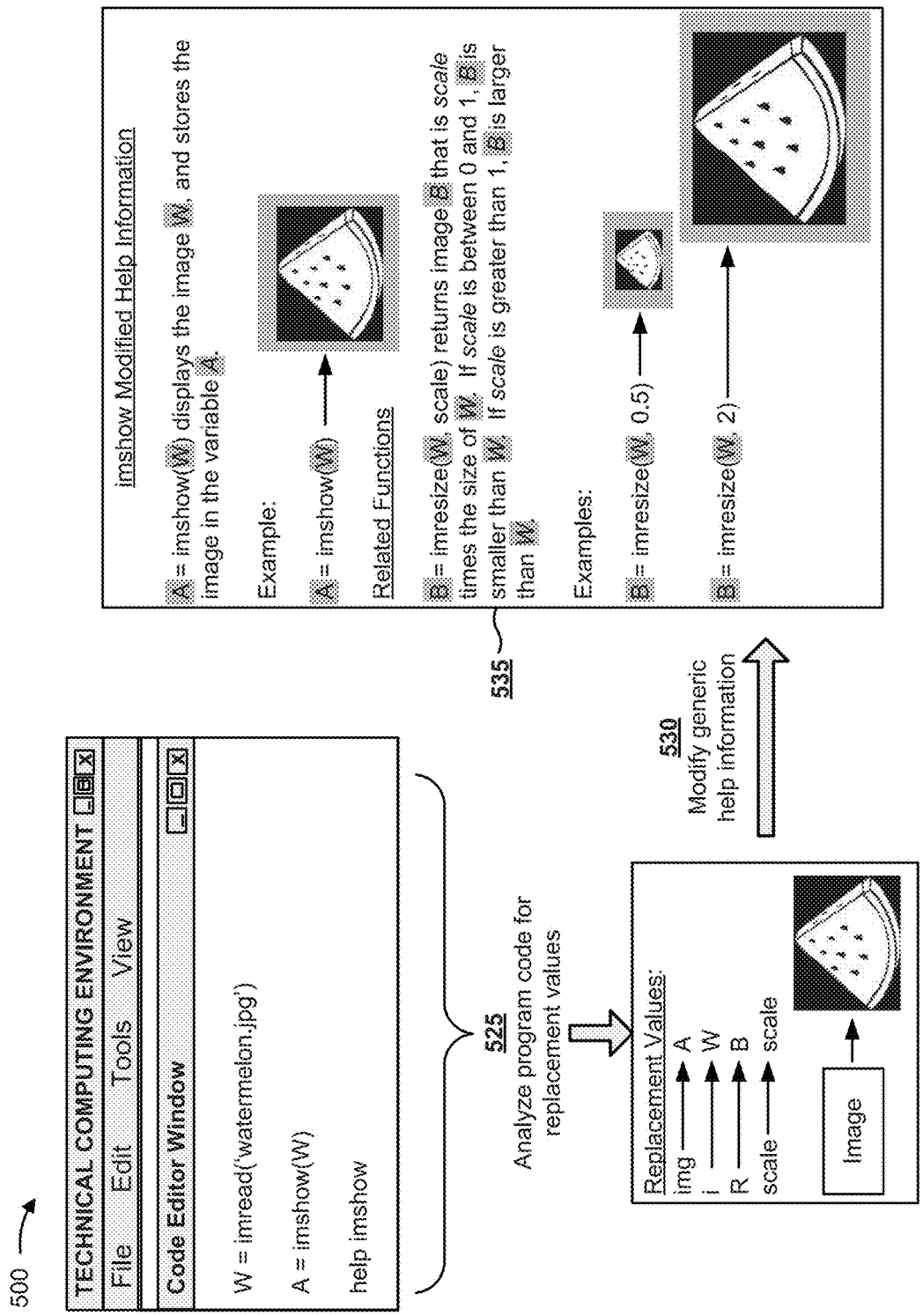

FIGS. 5A-5C are diagrams of an example implementation 500 relating to example process 400 shown in FIG. 4. FIGS. 5A-5C show an example of using program code to generate help information.

As shown in FIG. 5A, and by reference number 505, assume that a user interacts with TCE 220, provided via client device 210, to input program code, shown as W=imread('watermelon.jpg') to read an image from the file watermelon.jpg, and A=imshow(W) to display the image. As shown by reference number 510, assume that the user also inputs a help command related to the input function imshow (e.g., "help imshow"). Based on receiving the help command, client device 210 identifies generic help information associated with the imshow function, as shown by reference number 515. As shown by reference number 520, assume that the generic help information uses replaceable variable names, such as img and i, in the statement img=imshow(i) and in an explanation of this statement. Further, assume that the generic help information uses a replaceable image, shown as a box that contains the word "Image," to help explain the imshow function. Furthermore, assume that the generic help information identifies an imresize function as being related to the imshow function, and includes replaceable variable names R, i, and scale in the statement R=imresize(i,scale) and in an explanation of this statement.

As shown in FIG. 5B, and by reference number 525, assume that client device 210 uses a set of rules to analyze the program code for replacement values to replace the replaceable values. For example, client device 210 may determine criteria associated with the replaceable value, such as a particular type of variable (e.g., a 2 by 10 integer matrix), and may replace the replaceable value with a replacement value from the user's workspace that satisfies the criteria. If more than one replacement value satisfies the criteria, client device 210 may select a replacement value that is nearest in proximity to a selected portion of program code (e.g., used to generate the help information).

As further shown in FIG. 5B, assume that client device 210 determines to replace the variable name img with the variable name A, determines to replace the variable name i with the variable name W, determines to replace the variable name R with the variable name B, determines not to replace the variable name scale, and determines to replace the image from the generic help information with an image of a watermelon loaded from the file watermelon.jpg.

As shown by reference number 530, assume that client device 210 modifies the generic help information by replacing replaceable values with replacement values. As shown by reference number 535, assume that client device 210 replaces the replaceable variable name img with a corresponding replacement variable name A used in the program code. Further, assume that client device 210 replaces the replaceable variable name i with a corresponding replacement variable name W used in the program code. Further, assume that client device 210 replaces the replaceable image with a replacement image of a watermelon loaded from the file 'watermelon.jpg'.

In the related functions section of the help information, assume that client device 210 replaces the replaceable variable name R with the replacement variable name B. Client device 210 may choose the variable name B because it follows the variable name A in alphabetical order. In another scenario, client device 210 may replace the variable name R because the program code in the code editor window may use the variable name R for a different variable.

As shown in FIG. 5C, and by reference number 540, assume that client device 210 provides the modified help information for display via the help window of a user interface. As shown by reference number 545, client device 210 may provide an indication of program code that caused the modified help information to be displayed, and/or may provide an indication of program code used to generate the modified help information. As shown by reference number 550, client device 210 may provide an indication of program code, included in the help information, that was modified based on program code provided via the code editor window. As further shown, client device 210 may execute the program code, provided in the help information, to generate the image of the watermelon, also provided in the help information. In this way, client device 210 may provide a user with help information that is relevant to program code input by the user and/or provided via the code editor window.

As indicated above, FIGS. 5A-5C are provided merely as an example. Other examples are possible and may differ from what was described with regard to FIGS. 5A-5C.

FIG. 6 is a flow chart of an example process 600 for using help information to generate program code. In some implementations, one or more process blocks of FIG. 6 may be performed by client device 210. In some implementations, one or more process blocks of FIG. 6 may be performed by another device or a group of devices separate from or including client device 210, such as server device 230.

As shown in FIG. 6, process 600 may include receiving a selection of help information provided via a help portion of a user interface (block 610), generating program code based on the selected help information (block 620), and inserting the generated program code into a program provided via a code editor portion of the user interface (block 630). For example, client device 210 may receive a user selection of help information provided for display via a help portion of a user interface. Client device 210 may receive the selection by detecting a user interaction with the help information, such as by clicking on a particular portion of help information (e.g., using a mouse), touching a portion of a display corresponding to particular help information (e.g., via a touch screen display), navigating to particular help information (e.g., using a keyboard, a mouse, etc.), or the like.

In some implementations, the selected help information may include program code (e.g., text and/or an object that is executable in a programming environment, such as TCE 220). In this case, client device 210 may receive an indication to insert the program code in a program provided via the code editor window, and may insert the program code in the program based on receiving the indication. The indication may be received via an interaction with the code editor window, the help window, or the like. For example, the user may interact with an input mechanism (e.g., a button, a menu item, a link, etc.), may perform a drag and drop operation, may perform a copy and paste operation, etc. In some implementations, the user may specify a location where the program code is to be inserted into the program, and client device 210 may insert the program code into the specified location.

Additionally, or alternatively, the selected help information may include a description of program code, and client device 210 may use the description to generate program code (e.g., based on information stored in a data structure). Client device 210 may insert the generated program code into a program provided via the code editor window. In this way, a user may easily create a program with the assistance of client device 210.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
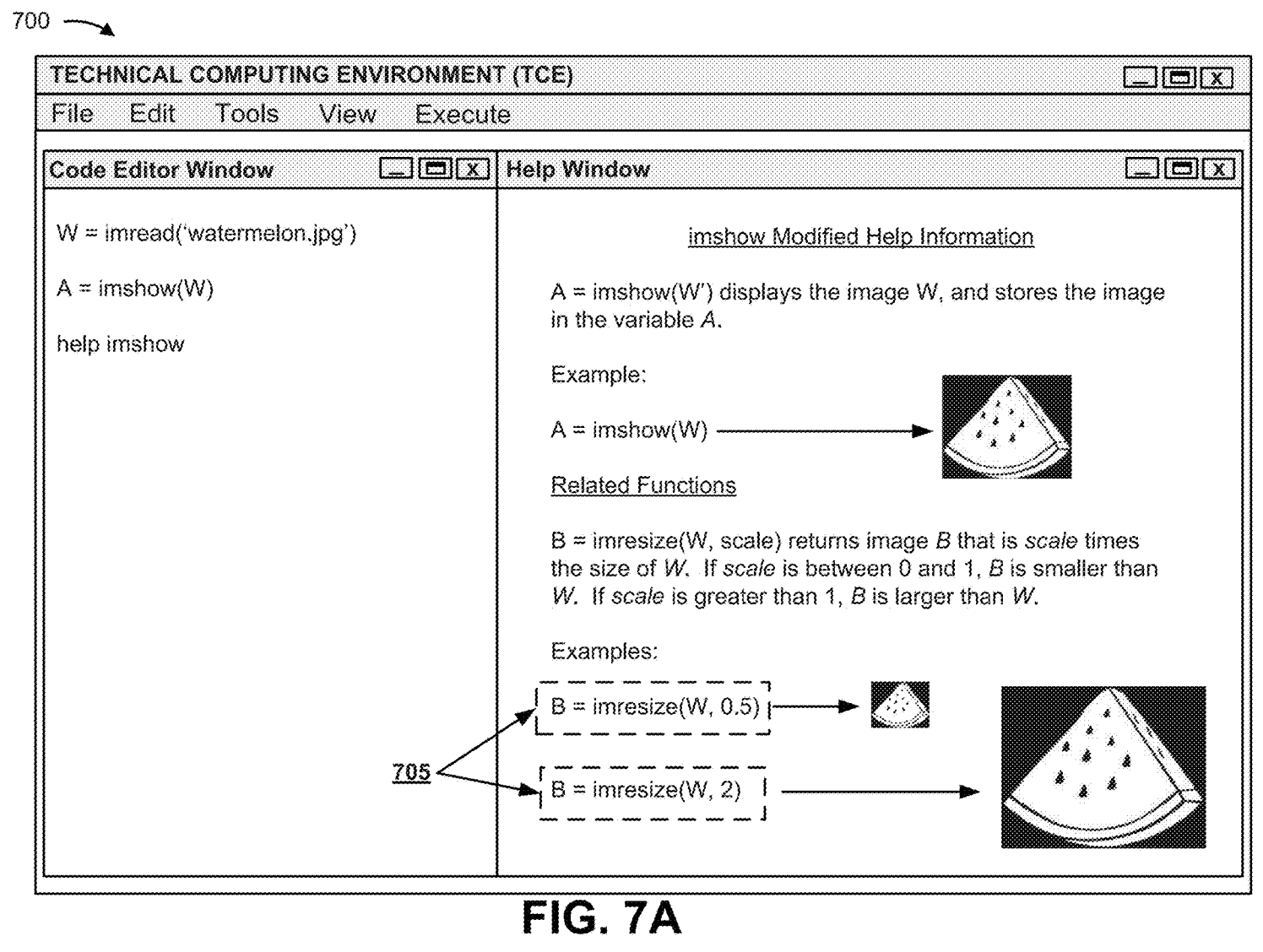
Figure 7B:
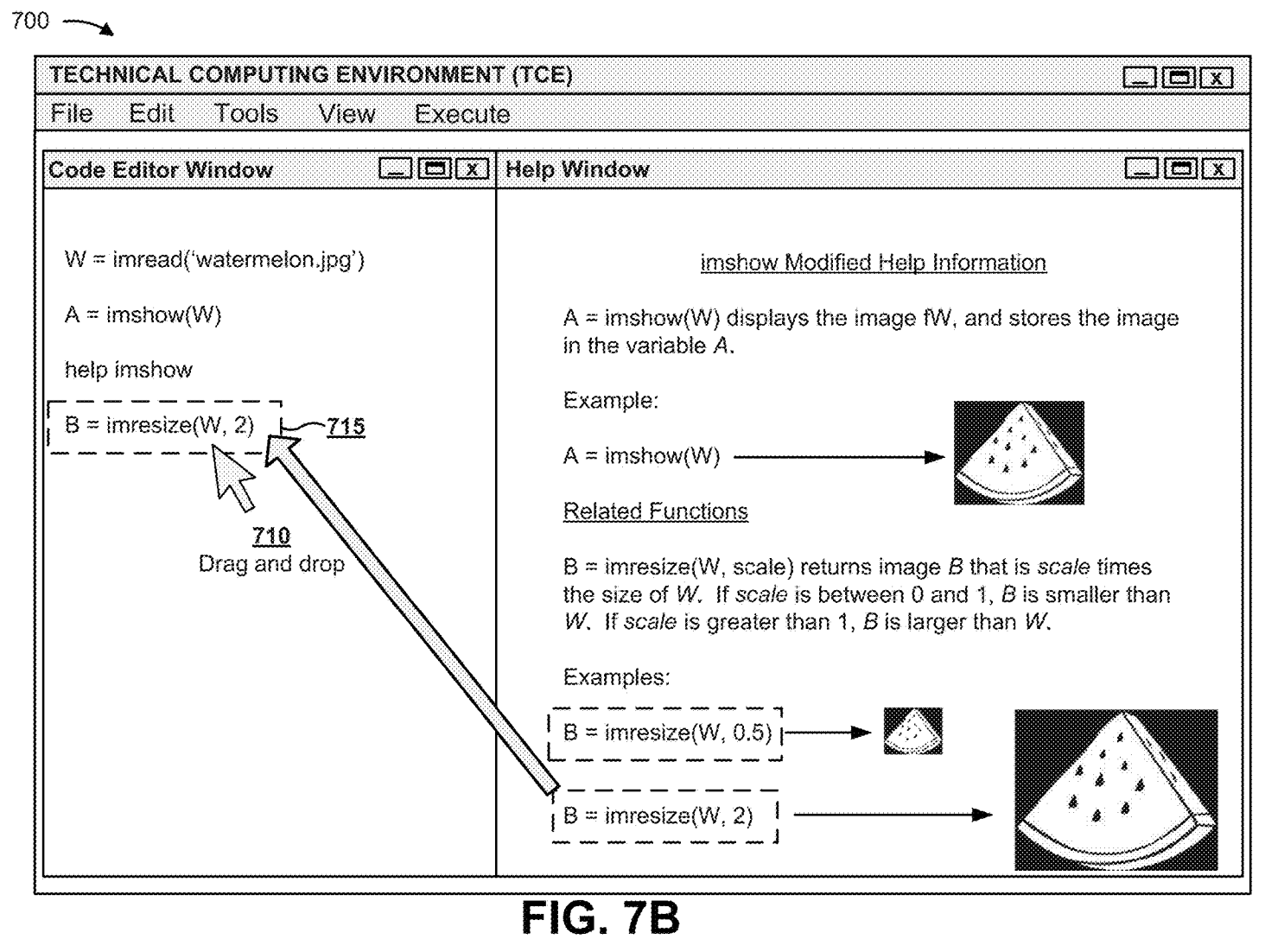

FIGS. 7A and 7B are diagrams of an example implementation 700 relating to example process 600 shown in FIG. 6. FIGS. 7A and 7B show an example of using help information to generate program code. For the purpose of FIGS. 7A and 7B, assume that the user and client device 210 have performed the operations described herein in connection with example implementation 500 of FIGS. 5A-5C.

As shown in FIG. 7A, and by reference number 705, client device 210 may provide an indication of help information that may be used to generate program code. For example, assume that client device 210 displays a box around the help information B=imresize(W,0.5), and B=imresize(W,2), indicating that these portions of help information include program code that may be inserted into the program shown in the code editor window.

As shown in FIG. 7B, and by reference number 710, assume that the user drags and drops the program code B=imresize(W,2) from the help window to the code editor window. As shown by reference number 715, client device 210 inserts the selected help information (e.g., B=imresize (W,2)) into the program provided by the code editor window. In this way, a user may easily generate program code relevant to the program that the user is creating.

As indicated above, FIGS. 7A and 7B are provided merely as an example. Other examples are possible and may differ from what was described with regard to FIGS. 7A and 7B.

Figure 8A:
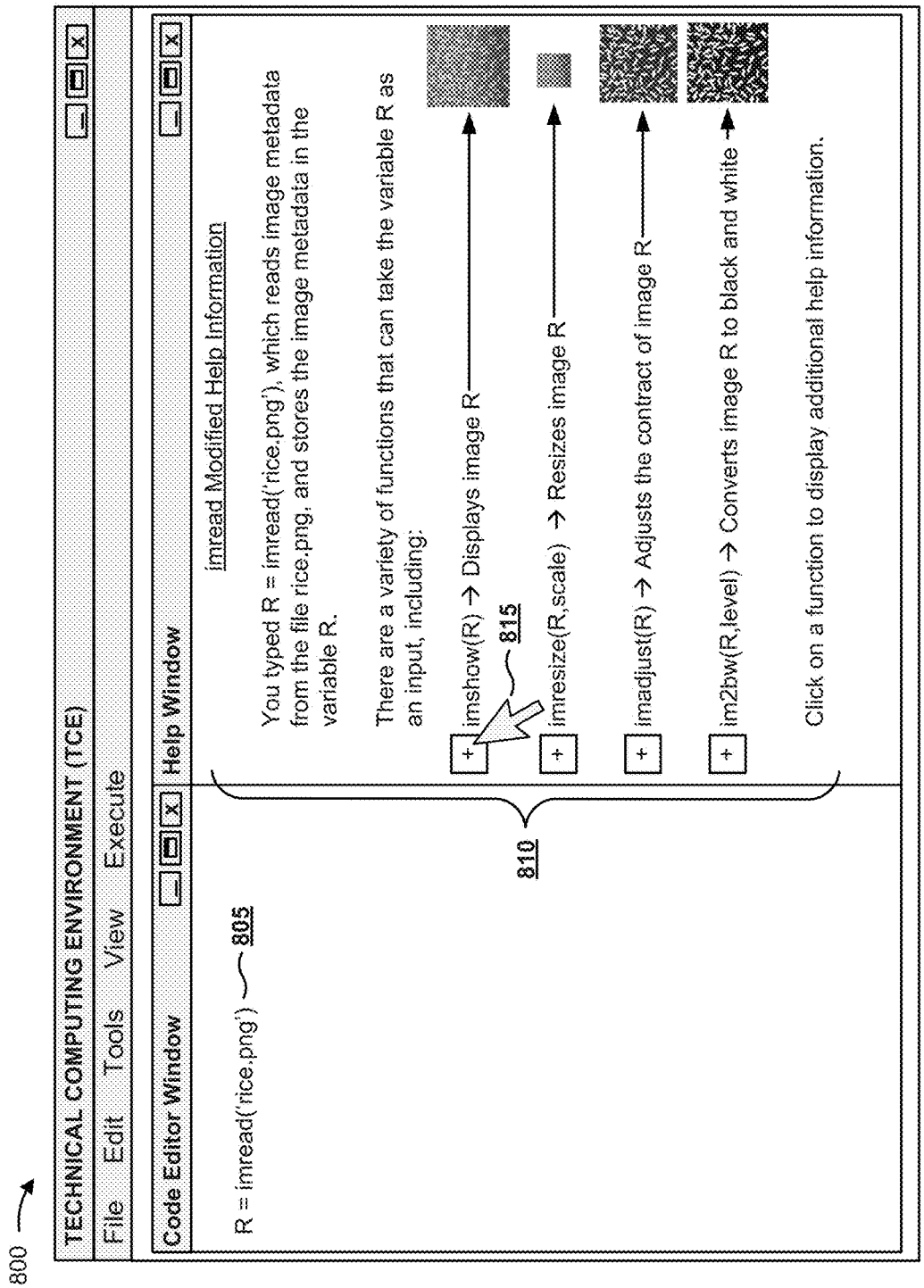
Figure 8B:
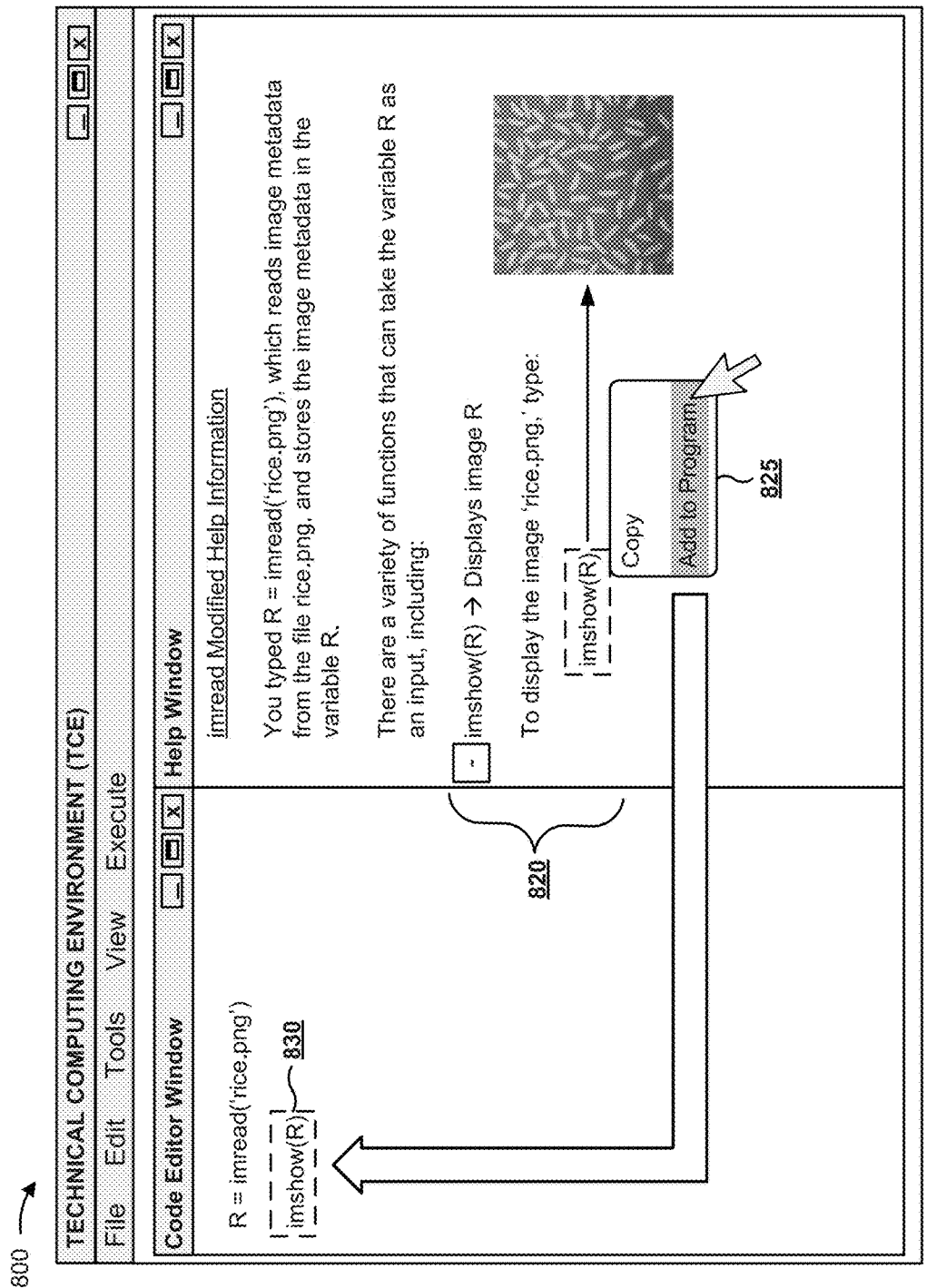

FIGS. 8A-8C are diagrams of an example implementation 800 relating to example process 400 shown in FIG. 4 and example process 600 shown in FIG. 6. FIGS. 8A-8C show an example of using program code to generate help information, and using help information to generate program code.

As shown in FIG. 8A, and by reference number 805, assume that a user has input program code, shown as R=imread('rice.png'), in a code editor window of a user interface. Assume that this program code loads image data from the image file rice.png, and stores the image data in the variable R as an array of information. Assume that client device 210 detects user input of this program code and determines that the variable R has a particular set of attributes associated with storing image data (e.g., that R is an array of a particular size, that stores information of a particular data type, etc.).

Based on this determination, assume that client device 210 determines a set of functions that are capable of using the variable R as input, and loads generic help information associated with the set of functions. Assume that client device 210 modifies the generic help information based on the program code, as described elsewhere herein (e.g., to replace a replaceable variable name with the replacement variable name R, to replace a replaceable image with the replacement image loaded from rice.png, etc.). As shown by reference number 810, assume that client device 210 provides the modified help information for display via a help window of the user interface.

As further shown by reference number 810, assume that the modified help information includes information relating to a function for displaying the image rice.png (e.g., imshow (R)), a function for resizing the image (e.g., imresize(R, scale)), a function for adjusting a contrast of the image (e.g., imadjust(R)), and a function for converting the image to a black and white version of the image (e.g., im2bw(R,level)). Further, assume that client device 210 generates program code, using the program code provided in the code editor window, for each of these functions, executes the program code, and provides a result of executing the program code as part of the modified help information (e.g., various images that show a result of applying the various functions to the image rice.png). As shown by reference number 815, assume that the user interacts with the help information associated with the imshow function to provide more information about the imshow function.

As shown in FIG. 8B, and by reference number 820, assume that the user interaction causes client device 210 to provide additional help information associated with the imshow function. Assume that the additional help information includes sample program code imshow(R), generated based on the program code provided in the code editor window (e.g., using the replacement variable R). As shown by reference number 825, assume that the user interacts with the sample program code (e.g., by right-clicking), and selects an option to add the sample program code to a program provided via the code editor window. As shown by reference number 830, assume that the user interaction causes the sample program code to be inserted into the program. In some implementations, client device 210 may prompt the user to indicate a location in the program at which the sample program code is to be inserted, and may insert the sample program code into the program at the indicated location.

As shown in FIG. 8C, and by reference number 835, assume that the user interacts with the modified help information to cause client device 210 to provide additional help information associated with the im2bw function, which may be used to convert an image to a black and white version of the image. As shown by reference number 840, assume that the modified help information includes three portions of sample program code used to generate the black and white image. As shown by reference number 845, assume that client device 210 executes the three portions of sample program code to generate a black and white version of rice.png, and provides the black and white version for display.

As shown by reference number 850, assume that the user drags and drops the black and white version of the image from the help window to the code editor window (e.g., rather than dragging and dropping individual portions of sample program code). As shown by reference number 855, based on this user interaction, client device 210 inserts the three portions of sample program code, used to generate the black and white version of the image, into a program provided via the code editor window. In this way, a user may easily build a program using help information that provides sample program code generated based on program code included in the user's program.

As indicated above, FIGS. 8A-8C are provided merely as an example. Other examples are possible and may differ from what was described with regard to FIGS. 8A-8C.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Also, as used herein, the term "set" is intended to include one or more items, and may be used interchangeably with "one or more." Where only one item is intended, the term "one" or similar language is used. Also, as used herein, the terms "has," "have," "having," and the like are intended to be open-ended terms. Further, the phrase "based on" is intended to mean "based, at least in part, on" unless explicitly stated otherwise.

What is claimed is:

1. A method comprising:
analyzing, by one or more processors, first program code based on receiving the first program code,
the first program code comprising a variable and being provided for display on a user interface,
generating, by the one or more processors, help information for the first program code based on analyzing the first program code,
the help information comprising one or more possible actions to take on the variable,
the one or more possible actions being associated with one or more functions,
providing, by the one or more processors, the help information for display on the user interface with the first program code,
generating, by the one or more processors, second program code for executing at least one of the one or more possible actions on the variable included in the first program code, and
inserting, by the one or more processors, a selected portion of the second program code into the first program code based on receiving a user instruction.

2. The method of claim 1, further comprising:
generating a result for each of the one or more possible actions to take on the variable and providing the result for display on the user interface.

3. The method of claim 2, where generating the result comprises:
generating the second program code for each of the one or more possible actions to take on the variable and executing the second program code.

4. The method of claim 3, where inserting the selected portion of the second program code comprises:
selecting the selected portion of the second program code corresponding to a selected result generated from executing the second program code.

5. The method of claim 1, where inserting the selected portion of the second program code comprises:
inserting the selected portion of the second program code at a predetermined location.

6. The method of claim 5, where the predetermined location is chosen by a user.

7. The method of claim 1, where the help information comprises a description of the one or more possible actions, and
generating the second program code comprises:
generating the second program code based on at least part of the description.

8. A device comprising:
one or more processors to:
analyze first program code upon receiving the first program code,
the first program code comprising a variable and being provided for display on a user interface, generate help information for the first program code based on analyzing the first program code,
the help information comprising one or more possible actions to take on the variable,
the one or more possible actions being associated with one or more functions,
provide the help information for display on the user interface with the first program code,
generate second program code for at least one of the one or more possible actions, and
insert a selected portion of the second program code into the first program code based on receiving a user instruction.

9. The device of claim 8, where the one or more processors are further to:
generate a result for each of the one or more possible actions to take on the variable and provide the result for display on the user interface.

10. The device of claim 9, where the one or more processors, when generating the result, are to:
generate the second program code for each of the one or more possible actions to take on the variable and executing the second program code.

11. The device of claim 10, where the one or more processors, when inserting the selected portion of the second program code, are to:
select the selected portion of the second program code corresponding to a selected result generated from executing the second program code.

12. The device of claim 8, where the one or more processors, when inserting the selected portion of the second program code, are to:
insert the selected portion of the second program code at a predetermined location.

13. The device of claim 12, where the predetermined location is chosen by a user.

14. The device of claim 8, where the help information comprises a description of the one or more possible actions, and
the one or more processors, when generating the second program code, are to:
generate the second program code based on at least part of the description.

15. A non-transitory computer-readable medium storing instructions, the instructions comprising:
one or more instructions that, when executed by one or more processors, cause the one or more processors to:
analyze first program code based on receiving the first program code,
the first program code comprising a variable and being provide for display on a user interface,
generate help information for the first program code based on analyzing the first program code,
the help information comprising one or more possible actions to take on the variable,
the one or more possible actions being associated with one or more functions,
provide the help information for display on the user interface with the first program code,
generate second program code for at least one of the one or more possible actions, and
insert a selected portion of the second program code into the first program code based on receiving a user instruction.

16. The non-transitory computer-readable medium of claim 15, where the one or more instructions, when executed by the one or more processors, further cause the one or more processors to:
generate a result for each of the one or more possible actions to take on the variable and provide the result for display on the user interface.

17. The non-transitory computer-readable medium of claim 16, where the one or more instructions, that cause the one or more processors to generate the result, further cause the one or more processors to:
generate the second program code for each of the one or more possible actions to take on the variable and executing the second program code.

18. The method of claim 1, where the one or more functions are capable of using the variable as an input.

19. The device of claim 9, where the one or more functions are capable of using the variable as an input.

20. The non-transitory computer-readable medium of claim 15, where the one or more functions are capable of using the variable as an input.

* * * * *